US011224053B2

(12) United States Patent
Lai (10) Patent No.: US 11,224,053 B2
(45) Date of Patent: Jan. 11, 2022

(54) MOBILE COMMUNICATION DEVICES AND METHODS FOR SCHEDULING DATA TRAFFIC COMMUNICATION

(71) Applicant: Wistron Corp., New Taipei (TW)

(72) Inventor: Cheng-Chia Lai, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/832,184

(22) Filed: Mar. 27, 2020

(65) Prior Publication Data

US 2021/0258984 A1    Aug. 19, 2021

(30) Foreign Application Priority Data

Feb. 14, 2020  (TW) .................................. 109104636

(51) Int. Cl.
*H04W 36/00*   (2009.01)
*H04W 72/12*   (2009.01)
*H04W 28/02*   (2009.01)

(52) U.S. Cl.
CPC ... *H04W 72/1252* (2013.01); *H04W 28/0268* (2013.01); *H04W 72/1226* (2013.01)

(58) Field of Classification Search
USPC .......................................................... 370/329
See application file for complete search history.

(56) References Cited

U.S. PATENT DOCUMENTS

| | | | |
|---|---|---|---|
| 9,225,630 | B2 | 12/2015 | Gouache et al. |
| 9,490,948 | B2 | 11/2016 | Doken et al. |
| 10,103,974 | B2 | 10/2018 | Sheu et al. |
| 2012/0008535 | A1 | 1/2012 | Kuehnel |
| 2014/0010207 | A1 | 1/2014 | Horn et al. |

(Continued)

FOREIGN PATENT DOCUMENTS

| | | |
|---|---|---|
| CN | 102348249 A | 2/2012 |
| CN | 104620666 A | 5/2015 |

(Continued)

OTHER PUBLICATIONS

J. Liu, A. Rayamajhi and J. Martin, "Using MPTCP subflow association control for heterogeneous wireless network optimization," 2016 14th International Symposium on Modeling and Optimization in Mobile, Ad Hoc, and Wireless Networks (WiOpt), Tempe, AZ, USA, 2016, pp. 1-8 (Year: 2016).*

(Continued)

*Primary Examiner* — Nathan S Taylor
(74) *Attorney, Agent, or Firm* — McClure, Qualey & Rodack, LLP (57) ABSTRACT

A mobile communication device including a wireless transceiver and a controller is provided. The wireless transceiver performs wireless transmission and reception to and from a first base station and a second base station. The controller communicates data traffic of an application over a first Multi-Path Transmission Control Protocol (MPTCP) sub-flow with the first base station via the wireless transceiver, and determines a most suitable base station for the mobile communication device according to a machine learning model or a rule-based model. Also, the controller transfers the data traffic to be communicated over a second MPTCP sub-flow with the second base station via the wireless transceiver in response to the most suitable base station being the second base station.

16 Claims, 8 Drawing Sheets

(56) References Cited

U.S. PATENT DOCUMENTS

| | | | |
|---|---|---|---|
| 2016/0099963 A1* | 4/2016 | Mahaffey | H04W 12/12 726/25 |
| 2016/0212759 A1* | 7/2016 | Schliwa-Bertling | H04L 45/245 |
| 2016/0242180 A1 | 8/2016 | Richards et al. | |
| 2017/0019857 A1* | 1/2017 | Han | H04W 52/028 |
| 2017/0078206 A1* | 3/2017 | Huang | H04L 47/193 |
| 2017/0290036 A1* | 10/2017 | Han | H04L 43/0882 |
| 2017/0302549 A1* | 10/2017 | Han | H04L 67/303 |
| 2017/0339257 A1* | 11/2017 | Kanagarathinam | H04W 80/06 |
| 2017/0366445 A1* | 12/2017 | Nemirovsky | H04L 45/24 |
| 2018/0103123 A1* | 4/2018 | Skog | H04L 69/14 |
| 2018/0302941 A1* | 10/2018 | Li | H04L 45/24 |
| 2019/0110231 A1* | 4/2019 | Youn | H04L 12/4633 |
| 2019/0166532 A1* | 5/2019 | NI | H04W 36/08 |
| 2019/0245868 A1* | 8/2019 | Patil | H04L 69/14 |
| 2019/0289477 A1* | 9/2019 | Huang | H04W 24/02 |
| 2019/0306068 A1* | 10/2019 | Kiss | H04L 45/24 |
| 2020/0229038 A1* | 7/2020 | Zhu | G06F 9/546 |
| 2020/0259738 A1* | 8/2020 | Wang | H04L 69/163 |
| 2020/0288212 A1* | 9/2020 | Alvarez Dominguez | H04N 21/2347 |
| 2020/0383158 A1* | 12/2020 | Misra | H04L 69/14 |
| 2020/0404540 A1* | 12/2020 | Kerpez | H04W 36/22 |
| 2021/0051108 A1* | 2/2021 | Akman | H04L 47/2416 |
| 2021/0058329 A1* | 2/2021 | Perras | H04L 45/24 |
| 2021/0058936 A1* | 2/2021 | Gordaychik | H04W 72/085 |

FOREIGN PATENT DOCUMENTS

| | | |
|---|---|---|
| TW | I591996 B | 7/2017 |
| TW | I607641 B | 12/2017 |
| TW | I624165 B | 5/2018 |
| WO | 2019/147970 A1 | 8/2019 |

OTHER PUBLICATIONS

Chinese language office action dated Feb. 26, 2021, issued in application No. TW 109104636.

\* cited by examiner

MOBILE COMMUNICATION DEVICES AND METHODS FOR SCHEDULING DATA TRAFFIC COMMUNICATION

CROSS REFERENCE TO RELATED APPLICATIONS

This application claims priority of Taiwan Patent Application No. 109104636, filed on Feb. 14, 2020, the entirety of which is incorporated by reference herein.

BACKGROUND OF THE APPLICATION

Field of the Application

The application generally relates to mobile communication, and more particularly, to mobile communication devices and methods for scheduling data traffic communication.

Description of the Related Art

With the growing demand for ubiquitous computing and networking, various wireless technologies have been developed, such as Short-Range Wireless (SRW) technologies and cellular technologies. SRW technologies include Wireless Fidelity (WiFi) technology, Bluetooth (BT) technology, and Zigbee technology, etc. Cellular technologies include Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1×EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and New Radio (NR) technology, etc. A mobile communication device may use one or more of the wireless technologies to connect to the Internet or to connect with a service network for obtaining wireless services.

In order to provide wireless services anytime and anywhere, network deployment tends to use small-cell base stations, especially in urban areas. However, the deployment of small-cell base stations may result in increases of handovers of the mobile communication devices, and frequent handovers may cause retransmissions of control signals or data packets, or may even cause service disconnection.

Figure 1:
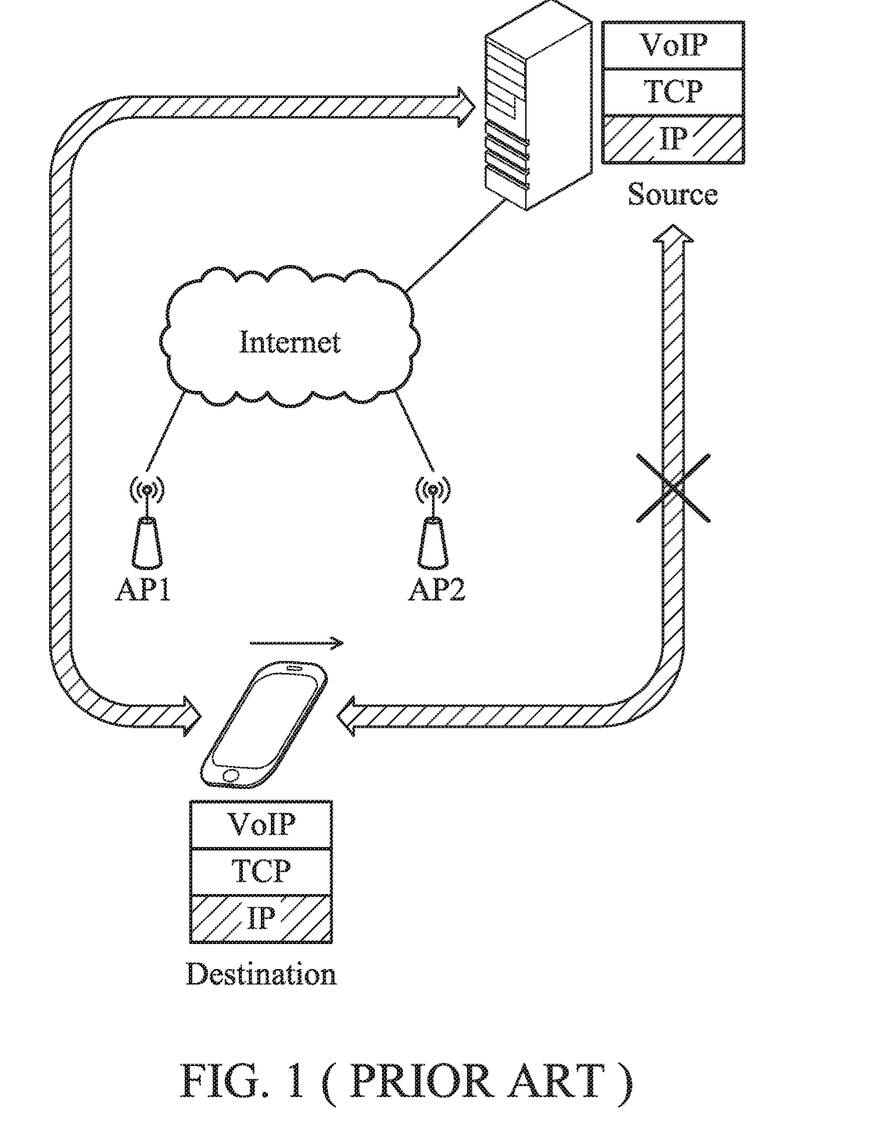
FIG. 1 is a schematic diagram illustrating a handover of a mobile communication device during a Voice over IP (VoIP) call.

FIG. 1 is a schematic diagram illustrating a handover of a mobile communication device during a Voice over IP (VoIP) call. As shown in FIG. 1, the mobile communication device switches from Access Point 1 (AP1) to Access Point 2 (AP2) due to the movement of the mobile communication device. From the perspective of the Internet Protocol (IP) layer, the handover only occurs in the physical layer if the IP address of the mobile communication device has not changed, and the physical-layer handover causes a relatively short delay of service. From the perspective of the VoIP application or the Transmission Control Protocol (TCP) layer, the handover is similar to a disconnection followed by a reconnection, and the VoIP call may continue after the handover by using the packet-retransmission mechanism to handle lost packets. However, if the IP address of the mobile communication device has changed after the handover, then service disconnection and loss of real-time packets are inevitable, which will cause bad user experience.

In a common practice trying to cope with the aforementioned problem, two separate connection interfaces are used to connect to AP1 and AP2 simultaneously. However, these two connections are independent of each other in the TCP layer. As a result, the service disconnection caused by a handover remains unresolved.

BRIEF SUMMARY OF THE APPLICATION

In one aspect of the application, a mobile communication device comprising a wireless transceiver and a controller is provided. The wireless transceiver is configured to perform wireless transmission and reception to and from a first base station and a second base station. The controller is configured to communicate data traffic of an application over a first Multi-Path Transmission Control Protocol (MPTCP) sub-flow with the first base station via the wireless transceiver, determine a most suitable base station for the mobile communication device according to a machine learning model or a rule-based model, and transfer the data traffic to be communicated over a second MPTCP sub-flow with the second base station via the wireless transceiver in response to the most suitable base station being the second base station.

In another aspect of the application, a method for scheduling data traffic communication, executed by a mobile communication device communicatively connected to one or both of a first base station and a second base station, is provided. The method comprises the steps of: communicating data traffic of an application over a first MPTCP sub-flow with the first base station; determining a most suitable base station for the mobile communication device according to a machine learning model pre-trained using history data of location information and mobility information of the mobile communication device and QoS information of the first base station and the second base station; and transferring the data traffic to be communicated over a second MPTCP sub-flow with the second base station in response to the most suitable base station being the second base station.

Other aspects and features of the present application will become apparent to those with ordinarily skill in the art upon review of the following descriptions of specific embodiments of the mobile communication devices and the methods for scheduling data traffic communication.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Please note that the term "base station", when used herein, may refer to Access Point (AP), Base Transceiver Station (BTS), Node-B (NB), evolved NodeB (eNB), 5G Node-B (gNB), Transmission Reception Point (TRP), or others, depending on the wireless technology in use.

Figure 2:
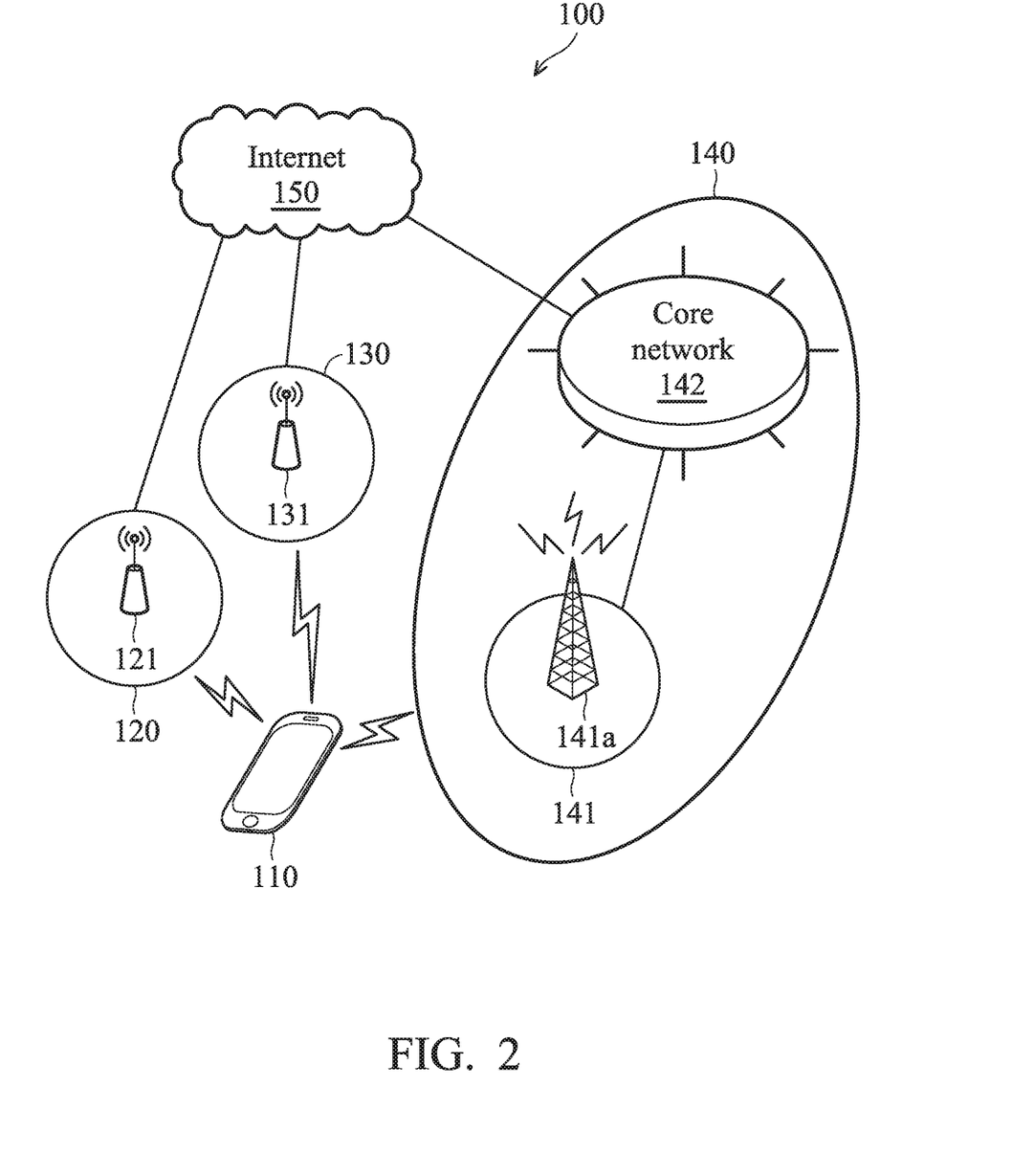
FIG. 2 is a block diagram of a wireless communication environment according to an embodiment of the application.

FIG. 2 is a block diagram of a wireless communication environment according to an embodiment of the application.

As shown in FIG. 2, the wireless communication environment 100 includes a mobile communication device 110, a plurality of Wireless Local Area Networks (WLANs) 120~130, a telecommunication network 140, and the Internet 150.

The mobile communication device 110 may be a smartphone, a wearable electronic apparatus, a panel Personal Computer (PC), a laptop computer, or any computing device supporting the SRW technology utilized by the WLANs 120~130 and the cellular technology utilized by the telecommunication network 140.

The WLANs 120~130 may be established by the APs 121~131, respectively.

Specifically, the APs 121~131 may connect to a wired local network via Ethernet cables, and then connect to the Internet 150 via the wired local network. The APs 121~131 are responsible for receiving, buffering, and transmitting data for the mobile communication device 110.

The telecommunication network 140 may include an access network 141 and a core network 142. The access network 141 includes at least a base station 141a, and is responsible for processing radio signals, terminating radio protocols, and connecting the mobile communication device 110 with the core network 142. The core network 142 is responsible for performing mobility management, network-side authentication, and interfaces with public/external networks (e.g., the Internet 150).

In one embodiment, the telecommunication network 140 may be a GSM/EDGE/GPRS network, the access network 141 may be a Base Station Subsystem (BSS), the base station 141a may be a BTS, and the core network 142 may be a GPRS core which includes at least a Mobile Switching Center (MSC), a Home Location Register (HLR), a Serving GPRS Support Node (SGSN), and a Gateway GPRS Support Node (GGSN).

In another embodiment, the telecommunication network 140 may be a WCDMA network, the access network 141 may be a Universal Terrestrial Radio Access Network (UTRAN), the base station 141a may be a 3G NB, and the core network 142 may be a GPRS core which includes at least an HLR, a Mobility Management Entity (MME), an SGSN, and a GGSN.

In another embodiment, the telecommunication network 140 may be an LTE/LTE-A/TD-LTE network, the access network 141 may be a Evolved UTRAN (E-UTRAN), the base station 141a may be an eNB, and the core network 142 may be an Evolved Packet Core (EPC) which includes at least a Home Subscriber Server (HSS), an MME, a Serving Gateway (S-GW), and a Packet Data Network Gateway (PDN-GW/P-GW).

In one embodiment, the telecommunication network 140 may be an (5G) NR network, the access network 141 may be a Next Generation-Radio Access Network (NG-RAN), the base station 141a may be a gNB, and the core network 142 may be a Next Generation-Core Network (NG-CN) which includes various network functions, such as Access and Mobility Function (AMF), Session Management Function (SMF), Policy Control Function (PCF), Application Function (AF), Authentication Server Function (AUSF), User Plane Function (UPF), and User Data Management (UDM), etc.

Generally speaking, the mobile communication device 110 may also be called a User Equipment (UE) or a Mobile Station (MS). The mobile communication device 110 may selectively connect to at least one of the APs 121~131 and the base station 141a to obtain mobile services (e.g., VoIP data traffic communication).

In particular, the mobile communication device 110 may support the Multi-Path Transmission Control Protocol (MPTCP). For example, the mobile communication device 110 may initiate two MPTCP connections with any two of the APs 121~131 and the base station 141a at the same time, and accordingly, associate two separate MPTCP sub-flows on the MPTCP connections. After that, the mobile communication device 110 may schedule the data traffic communication over one of the MPTCP sub-flows.

Specifically, before the mobile communication device 110 hands over from the AP 121 to the AP 131, or from the AP 121/131 to the base station 141a, or from the base station 141a to the AP 121/131, the mobile communication device 110 may determine/predict the most suitable base station according to a machine learning model or a rule-based model. If the most suitable base station is not the base station to which the mobile communication device 110 is currently connected, it means that a handover of the mobile communication device 110 is upcoming. In response, the mobile communication device 110 may transfer the data traffic communication from the current MPTCP sub-flow to another MPTCP sub-flow, so as to realize seamless handover.

Figure 3:
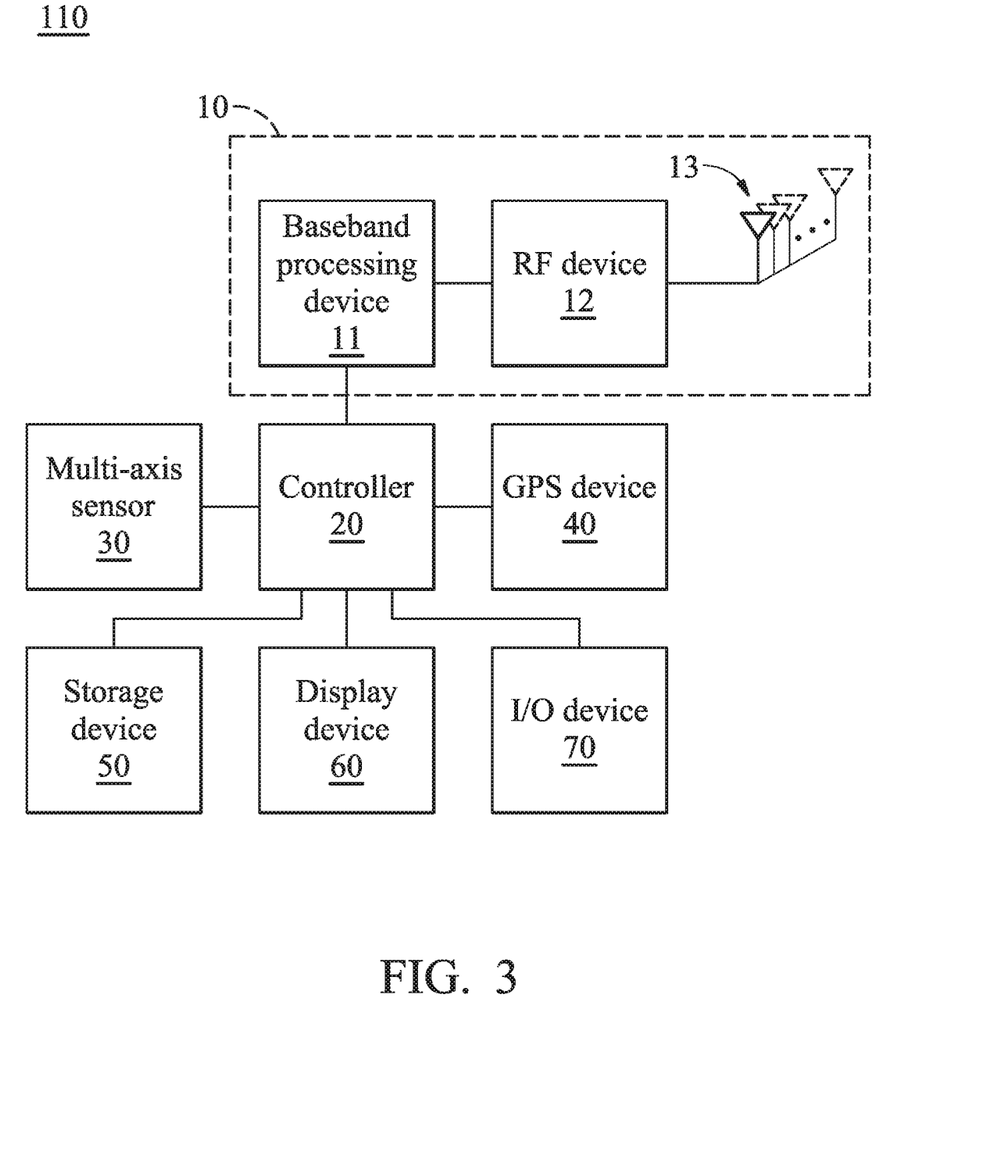
FIG. 3 is a block diagram illustrating the hardware architecture of the mobile communication device 110 according to an embodiment of the application.

FIG. 3 is a block diagram illustrating the hardware architecture of the mobile communication device 110 according to an embodiment of the application.

As shown in FIG. 3, the mobile communication device 110 may include a wireless transceiver 10, a controller 20, a multi-axis sensor 30, a Global Positioning System (GPS) device 40, a storage device 50, a display device 60, and an Input/Output (I/O) device 70.

The wireless transceiver 10 may use an SRW technology to perform wireless transmission and reception to and from the WLANs 120~130, and use a cellular technology to perform wireless transmission and reception to and from the telecommunication network 140.

Specifically, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technology, wherein the radio frequency may be 2.4 GHz, 3.6 GHz, 4.9 GHz, or 5 GHz utilized in the WiFi technology, or may be 900 MHz, 1800 MHz, or 1900 MHz utilized in the GSM/EDGE/GPRS technology, or may be 900 MHz, 1900 MHz, or 2100 MHz utilized in the WCDMA technology, or may be 900 MHz, 2100 MHz, or 2.6 GHz utilized in the LTE/LTE-A/TD-LTE technology, or may be 24~300 GHz utilized in the NR technology, or another radio frequency, depending on the wireless technology in use.

In another embodiment, the wireless transceiver 10 may include multiple sets of a baseband processing device, an RF device, and an antenna. One set of a baseband processing device, an RF device, and an antenna is configured to use an SRW technology to perform wireless transmission and reception to and from the WLANs 120~130, while another set of a baseband processing device, an RF device, and an antenna is configured to use a cellular technology to perform wireless transmission and reception to and from the telecommunication network 140.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the WLANs 120~130 and the telecommunication network 140, controlling the multi-axis sensor 30 for obtaining mobility information of the mobile communication device 110, controlling the GPS device 40 for obtaining location information of the mobile communication device 110, storing and retrieving data to and from the storage device 50, sending a series of frame data (e.g. representing text messages, graphics, images, etc.) to the display device 60, and receiving user inputs or outputting signals via the I/O device 70.

In particular, the controller 20 coordinates the aforementioned operations of the wireless transceiver 10, the multi-axis sensor 30, the GPS device 40, the storage device 50, the display device 60, and the I/O device 70 for performing the method for scheduling data traffic communication.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. More specifically, the controller 20 may include three components, including a control unit, an Arithmetic Logic Unit (ALU), and a register, but the application is not limited thereto. The control unit is responsible for controlling function executions according the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The multi-axis sensor 30 may include an accelerometer, a gyrometer, and a magnetometer, and the multi-axis sensor 30 is responsible for measuring the acceleration and the angular velocity of the mobile communication device 110 and the magnetic field of the location where the mobile communication device 110 is in. In addition, the multi-axis sensor 30 may calculate the moving speed and direction of the mobile communication device 110 according to the measured data.

The GPS device 40 is responsible for providing the location information of the mobile communication device 110 for use of some location-based services/applications and the method for scheduling data traffic communication.

The storage device 50 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, Operating Systems (OS), and/or the method for scheduling data traffic communication. The stored data may include: (1) history data of location information and mobility information of the mobile communication device 110, (2) history data of Quality of Service (QoS) information of the APs 121~131 and base station 141a, (3) the machine learning model pre-trained using the history data of location information and mobility information of the mobile communication device 110 and QoS information of the APs 121~131 and base station 141a, and/or (4) the rule-based model.

The display device 60 may be a Liquid-Crystal Display (LCD), a Light-Emitting Diode (LED) display, an Organic LED (OLED) display, or an Electronic Paper Display (EPD), etc., for providing a display function.

In another embodiment, the display device 60 may further include one or more touch sensors disposed thereon or thereunder for sensing touches, contacts, or approximations of objects (e.g., fingers or styluses), thereby enabling the display device 40 to be a touch-sensitive display device.

The I/O device 70 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application. For example, the mobile communication device 110 may include more components, such as a battery for powering the other components of the mobile communication device 110, etc. Alternatively, the mobile communication device 110 may include fewer components. For example, the mobile communication device 110 may not include the display device 60 and/or the I/O device 70.

Figure 4:
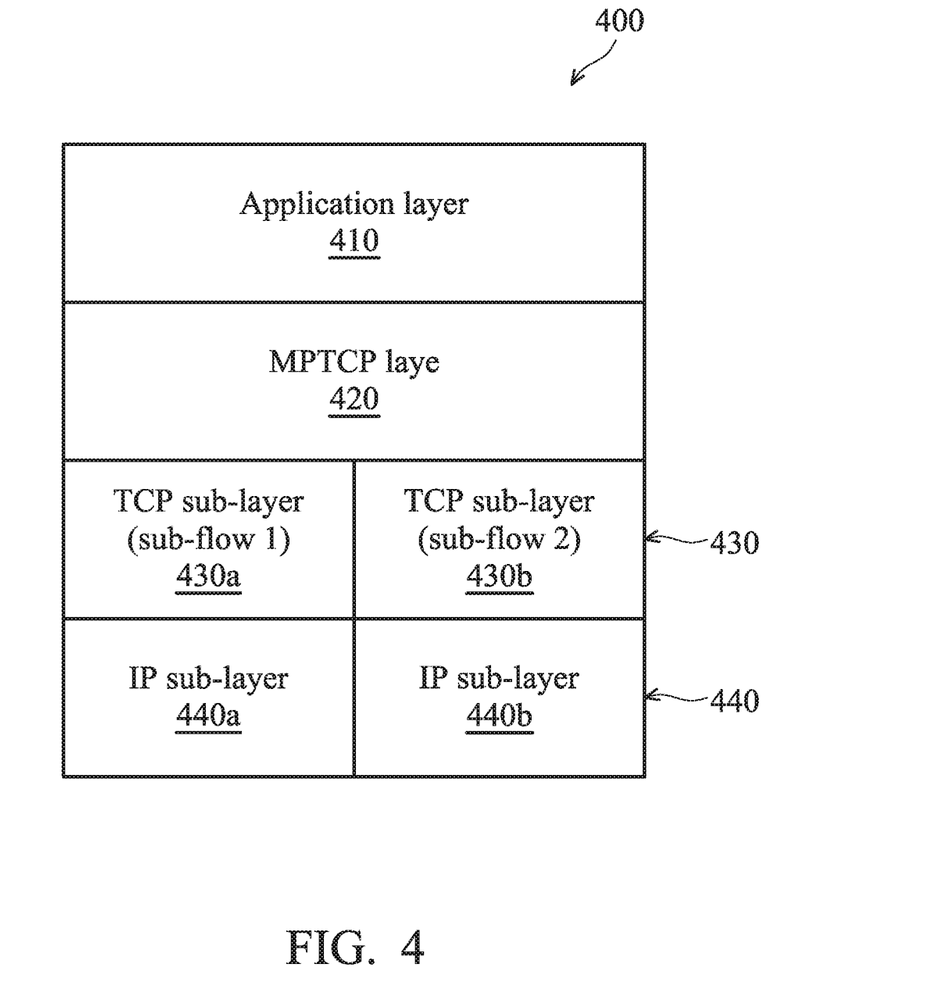
FIG. 4 is a block diagram illustrating an exemplary protocol stack according to an embodiment of the application.

FIG. 4 is a block diagram illustrating an exemplary protocol stack according to an embodiment of the application.

In this embodiment, the exemplary protocol stack is provided to demonstrate the protocol layers related to the MPTCP.

As shown in FIG. 4, the protocol stack 400 may include an application layer 410, an MPTCP layer 420, a TCP layer 430, and an IP layer 440. Based on the number of MPTCP sub-flows, each of the TCP layer 430 and the IP layer 440 may be divided into a plurality sub-layers. For example, the TCP layer 430 is divided into two TCP sub-layers 430a~430b, and the IP layer 440 is divided into two IP sub-layers 440a~440b. In particular, different MPTCP sub-flows may be allocated with different TCP connections in the TCP sub-layers 430a~430b. Likewise, different MPTCP sub-flows may be allocated with different IP connections in the IP sub-layers 440a~440b.

The application layer 410 may include various application protocols, such as VoIP, File Transfer Protocol (FTP), and/or HyperText Transfer Protocol (HTTP), etc.

The MPTCP layer 420 may be considered as an extension from the TCP layer 430, which allows a host (e.g., the mobile communication device 110) to use multiple paths to send and receive data belonging to one connection. The MPTCP layer 420 may be operated in the Transport layer in the Open Systems Interconnection (OSI) reference model, and may be transparent to the upper and lower layers of the Transport layer.

Specifically, an MPTCP connection may include several TCP connections that are called sub-flows. The MPTCP connection may manage creation, removal, and utilization of these sub-flows to realize multipath transmission.

After an MPTCP connection has begun, additional sub-flows may be added to the connection. If other paths (i.e., other transmission interfaces) are available, additional TCP sessions (i.e., MPTCP sub-flows) may be created on these paths, and may be combined with the existing MPTCP connection. Despite the plurality of subflows, the MPTCP session will continue to appear as a single connection to the application layer 410 at both the sender's end and the receiver's end.

It should be understood that while the exemplary protocol stack in FIG. 4 illustrates two sub-flows, an MPTCP connection may have fewer than two, or greater than two sub-flows under various circumstances.

Figure 5:
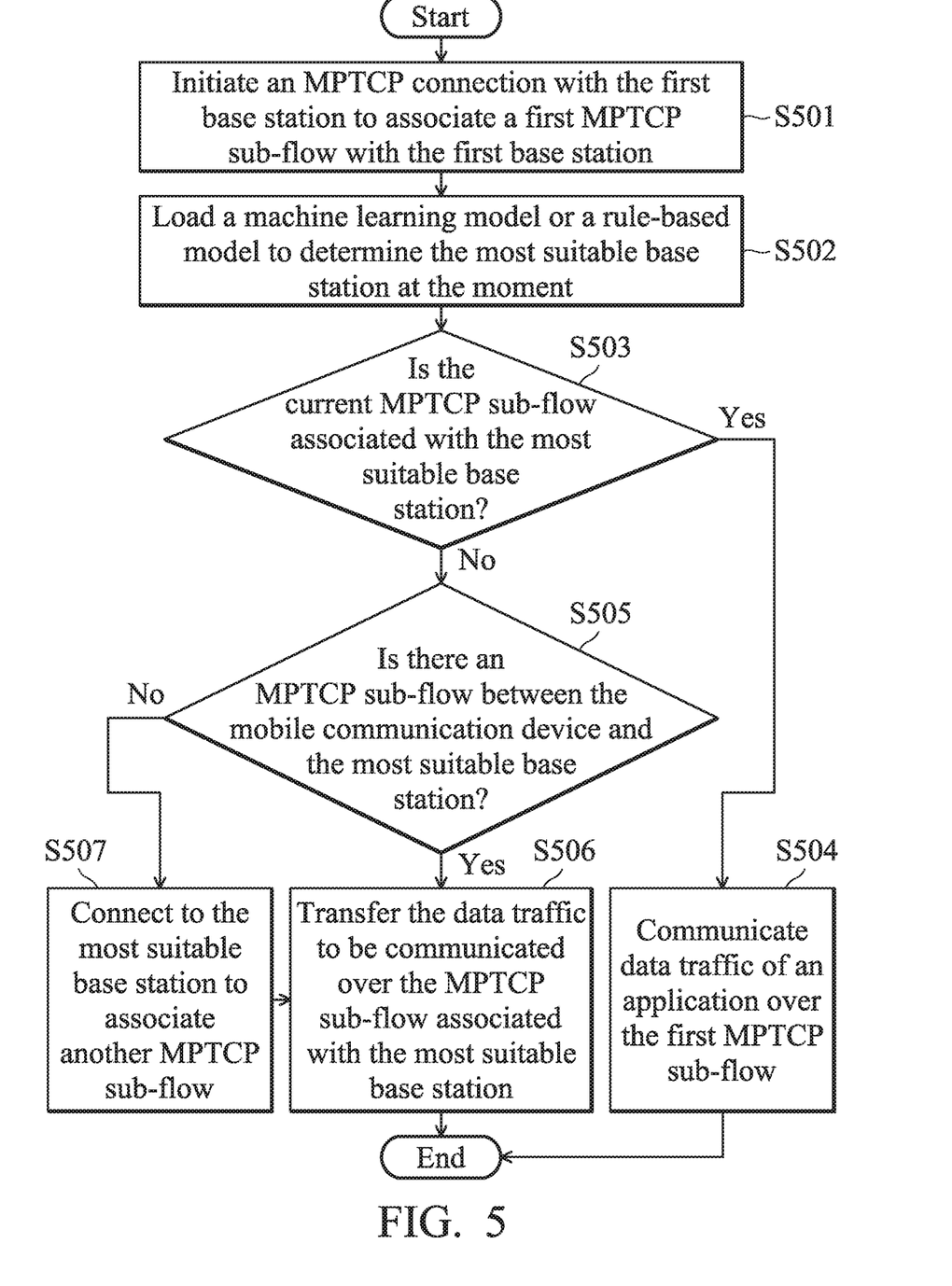
FIG. 5 is a flow chart illustrating the method for scheduling data traffic communication according to an embodiment of the application.

FIG. 5 is a flow chart illustrating the method for scheduling data traffic communication according to an embodiment of the application.

In this embodiment, the method for scheduling data traffic communication may be applied to a mobile communication device (e.g., the mobile communication device 110) that is communicatively connected to the first base station and/or the second base station (e.g., the APs 121~131 and the base station 141a), and may be performed periodically to adapt to movement of the mobile communication device.

To begin with, the mobile communication device initiates an MPTCP connection with the first base station to associate a first MPTCP sub-flow with the first base station (step S501). The first MPTCP sub-flow may be referred to as the current MPTCP sub-flow (i.e., the MPTCP sub-flow that is currently used by the mobile communication device). The details regarding initiation of an MPTCP connection are described later in FIG. 7.

Next, the mobile communication device loads a machine learning model or a rule-based model to determine the most suitable base station at the moment (step S502).

In one embodiment, the machine learning model or the rule-based model may be stored in the first base station or the second base station, and when the mobile communication device needs to load the machine learning model or the rule-based model, it may broadcast a User Datagram Protocol (UDP) packet on a predetermined port. In response to receiving the broadcasted UDP packet, the first base station or the second base station may send the machine learning model or the rule-based model to the mobile communication device.

In another embodiment, the machine learning model or the rule-based model may be stored in a remote server, and when the mobile communication device needs to load the machine learning model or the rule-based model, it may initiate an FTP session or an HTTP session to download the machine learning model or the rule-based model from the remote server.

In another embodiment, the machine learning model or the rule-based model may be pre-stored in an internal storage device (e.g., the storage device 50) of the mobile communication device.

The machine learning model may refer to a Long Short-Term Memory (LSTM) model, a Recurrent Neural Networks (RNN) model, a Convolutional Neural Networks (CNN) model, a Deep Neural Networks (DNN) model, or a Region-based Convolutional Neural Networks (R-CNN) model.

Specifically, the machine learning model may be pre-trained using the history data of location information and mobility information of the mobile communication device, and the history data of QoS information of the first base station and the second base station.

For example, the mobile communication device may collect the following data at different places: the location information (e.g., GPS information) of the mobile communication device, the mobility information (e.g., moving speed and direction) of the mobile communication device, the timestamps, the QoS information (e.g., signal strength and Round-Trip Time (RTT)) of the base stations, and the identification information (e.g., AP ID or cell ID) of the serving base station. The collected data may be referred to as the aforementioned history data.

To further clarify step S502, the mobile communication device may input, the current data of its location information and its mobility information and the current data of the QoS information of the first base station and the second base station, to the pre-trained machine learning model to determine a respective prediction level of each of the first base station and the second base station. If the prediction level of a base station is greater than a predetermined threshold, then this base station may be the most suitable base station for the mobile communication device.

For example, if the prediction level of the first base station is 75% and the prediction level of the second base station is 65%, it means that the first base station has a 75 percent chance of being the most suitable base station and the second base station has a 65 percent chance of being the most suitable base station. Assuming that the predetermined threshold is 70%, the first base station is determined to be the most suitable base station for the mobile communication device.

The rule-based model may include a plurality of predetermined rules, each of which may indicate one or more conditions and the most suitable base station when these conditions are met. For example, the rule-based model may include predetermined rules 1 and 2, wherein the predetermined rule 1 may indicate that the second base station is the most suitable base station when the following conditions are met: (1) the current location of the mobile communication device is somewhere between area X1 and area Y1; (2) the moving speed of the mobile communication device is within the range A1~B1; (3) the moving direction of the mobile communication device is east; (4) the signal strength of the first base station is less than H1; and (5) the signal strength of the second base station is greater than H2.

The predetermined rule 2 may indicate that the first base station is the most suitable base station when the following conditions are met: (1) the current location of the mobile communication device is somewhere between area X2 and area Y2; (2) the moving speed of the mobile communication device is within the range A2~B2; (3) the moving direction of the mobile communication device is west; (4) the signal strength of the first base station is greater than H1; and (5) the signal strength of the second base station is less than H1.

In one embodiment, if both the prediction levels of the first and second base stations are greater than the predetermined threshold, then the base station with the highest prediction level is the most suitable base station; and if both the prediction levels of the first and second base stations are less than the predetermined threshold, then the mobile communication device may use the rule-based model instead, to determine the most suitable base station.

Subsequent to step S502, the mobile communication device determines whether the current MPTCP sub-flow (i.e., the first MPTCP sub-flow) is associated with the most suitable base station (step S503).

Subsequent to step S503, if the current MPTCP sub-flow is associated with the most suitable base station (e.g., the first base station), the mobile communication device communicates data traffic of an application over the first MPTCP sub-flow (step S504), and the method ends.

Subsequent to step S503, if the current MPTCP sub-flow is not associated with the most suitable base station (e.g., the second base station), the mobile communication device determines whether there is an MPTCP sub-flow between the mobile communication device and the most suitable base station (step S505).

Subsequent to step S505, if there is an MPTCP sub-flow (e.g., the second MPTCP sub-flow) between the mobile communication device and the most suitable base station, the mobile communication device transfers the data traffic to be communicated over the MPTCP sub-flow associated with the most suitable base station (step S506), and the method ends.

Subsequent to step S505, if there is no MPTCP sub-flow between the mobile communication device and the most suitable base station, the mobile communication device connects to the most suitable base station to associate another MPTCP sub-flow (step S507), and the method proceeds to step S506. The details regarding creation of an MPTCP sub-flow are described later in FIG. 8.

Figure 6:
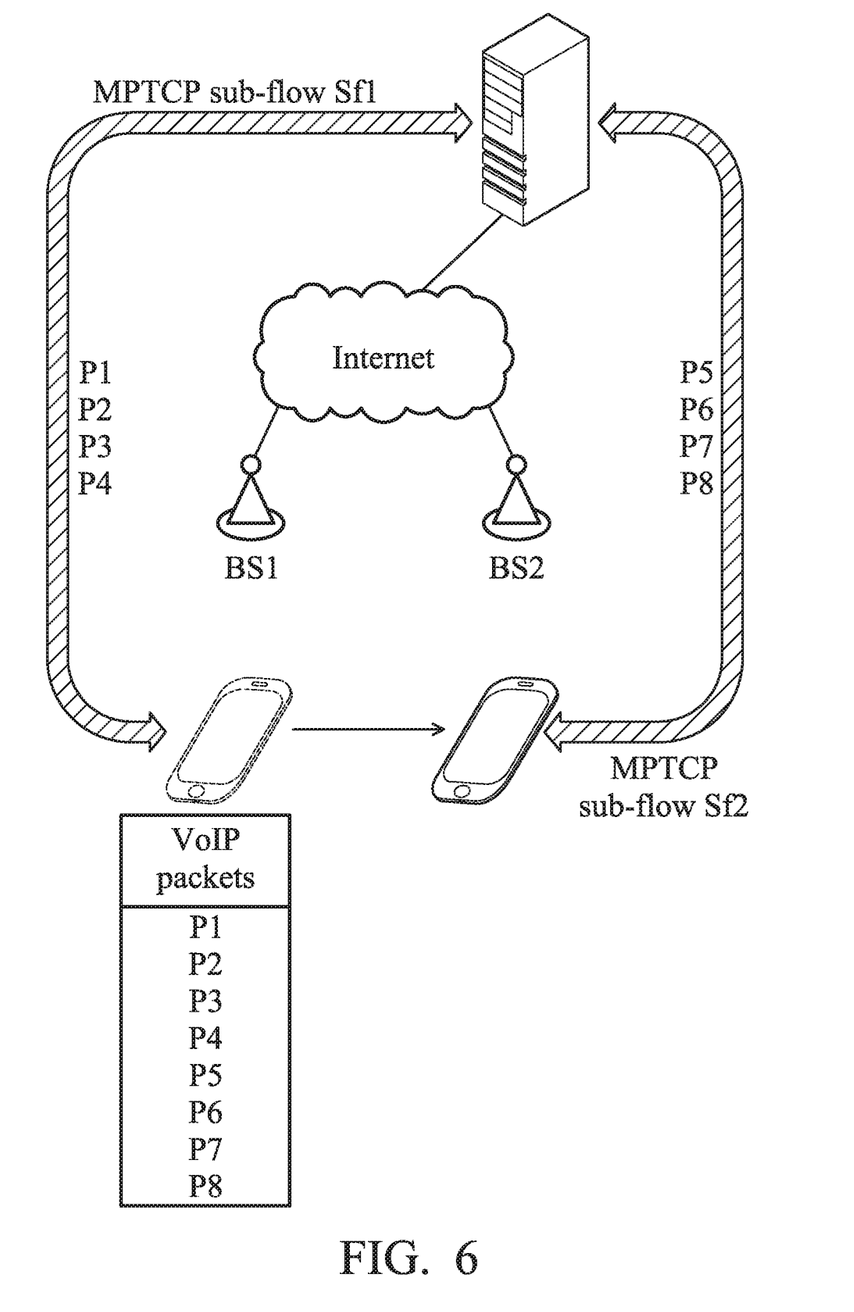
FIG. 6 is a schematic diagram illustrating the scheduling of data traffic communication according to an embodiment of the application.

FIG. 6 is a schematic diagram illustrating the scheduling of data traffic communication according to an embodiment of the application.

As shown in FIG. 6, the mobile communication device start to perform the method for scheduling data traffic communication when it is in a first position (denoted as a mobile phone in dashed line), and it determines that the first base station is the most suitable base station at that time. In response, the mobile communication device initiates an MPTCP connection with the first base station to associate an MPTCP sub-flow Sf1, and communicates the VoIP data traffic over the MPTCP sub-flow Sf1.

After packets P1~P4 of the VoIP data traffic have been transmitted over the MPTCP sub-flow Sf1, the mobile communication device moves to a second position (denoted as a mobile phone in solid line) and performs the method for scheduling data traffic communication. Due to the position change, the mobile communication device determines that the second base station is the most suitable base station at that time. In response, the mobile communication device connects to the second base station to associate another MPTCP sub-flow Sf2 on the current MPTCP connection, and transfers the VoIP data traffic to be communicated over the MPTCP sub-flow Sf2. That is, the subsequent packets P5~P8 of the VoIP data traffic are transmitted over the MPTCP sub-flow Sf2.

Figure 7:
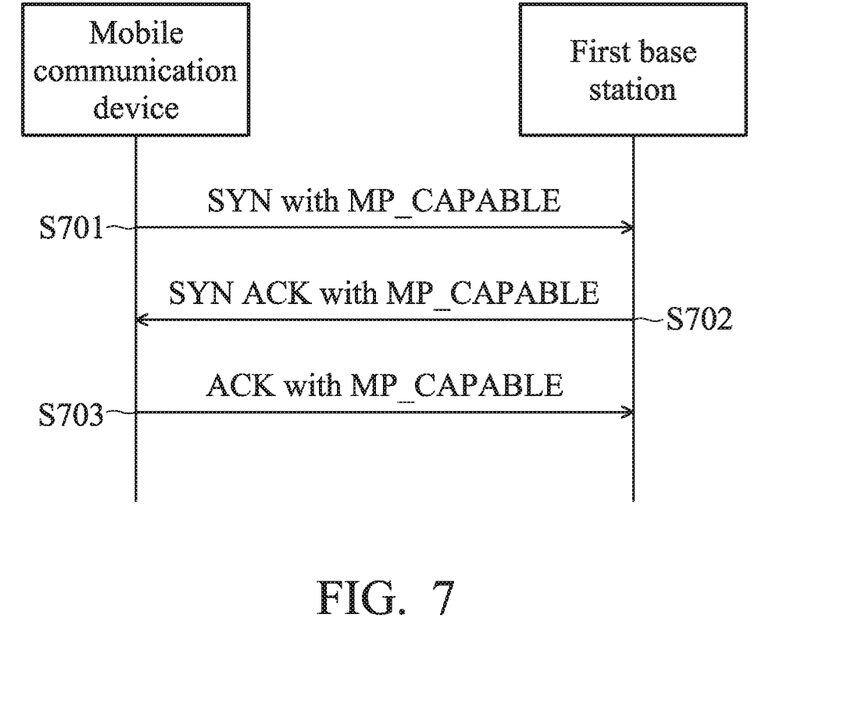
FIG. 7 is a message sequence chart illustrating the initiation of an MPTCP connection according to an embodiment of the application.

FIG. 7 is a message sequence chart illustrating the initiation of an MPTCP connection according to an embodiment of the application.

In step S701, for initiating an MPTCP connection, the mobile communication device sends a synchronization packet including an MP_CAPABLE option (denoted as SYN with MP_CAPABLE) to the first base station. The MP_CAPABLE option in the synchronization packet may include parameters, such as the version of MPTCP, and the sender key.

In step S702, the first base station replies a synchronization acknowledgement packet including an MP_CAPABLE option (denoted as SYN ACK with MP_CAPABLE) to the mobile communication device. The MP_CAPABLE option in the synchronization acknowledgement packet may include parameters, such as the receiver key.

In step S703, the mobile communication device sends an acknowledgement packet including an MP_CAPABLE option (denoted as ACK with MP_CAPABLE) to the first base station. The MP_CAPABLE option in the acknowledgement packet may include parameters, such as the sender key, and the receiver key.

The sender key/token and the receiver key/token exchanged during the three-way handshake in step S701~S703 may be used to authenticate the creation or removal of MPTCP sub-flows on the MPTCP connection.

Figure 8:
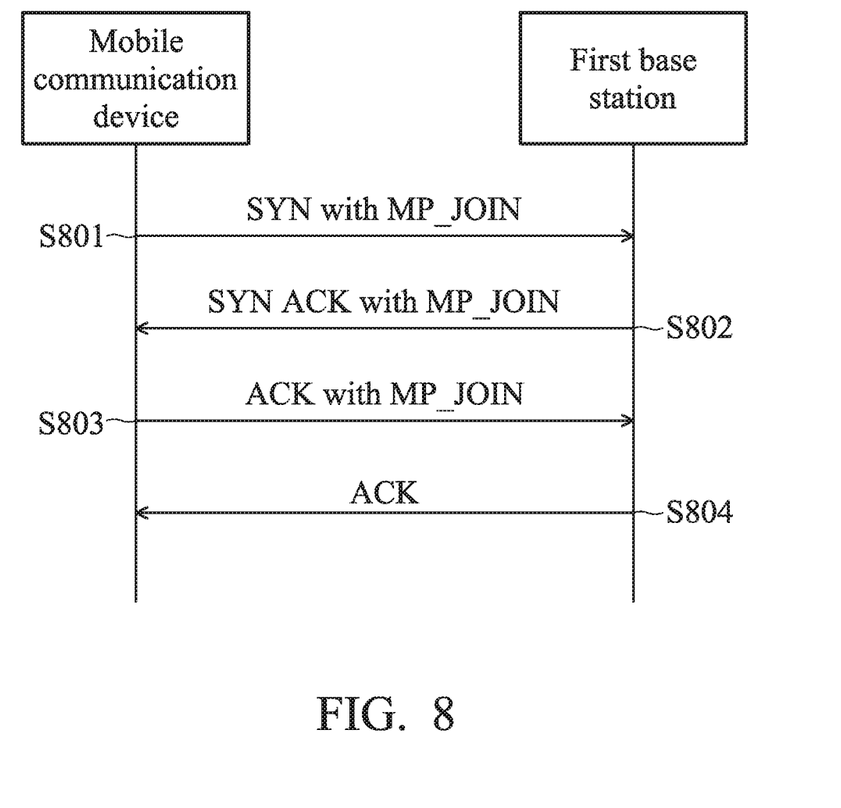
FIG. 8 is a message sequence chart illustrating the creation of an MPTCP sub-flow according to an embodiment of the application.

FIG. 8 is a message sequence chart illustrating the creation of an MPTCP sub-flow according to an embodiment of the application.

After an MPTCP connection has been established, the mobile communication device may request creation of an MPTCP sub-flow using a different connection interface on the MPTCP connection.

In step S801, the mobile communication device sends a synchronization packet including an MP_JOIN option (denoted as SYN with MP_JOIN) to the first base station. The MP_JOIN option in the synchronization packet may include parameters, such as the sender token, and a random number A.

The sender token is a hash value which is generated using the receiver key obtained during the initiation of the MPTCP connection, and is used to identify the MPTCP connection on which an addition MPTCP sub-flow is to be created. The random number A is provided for the first base station to generate a Hash-based Message Authentication Code (HMAC) X in the next step.

In step S802, the first base station replies a synchronization acknowledgement packet including an MP_JOIN option (denoted as SYN ACK with MP_JOIN) to the mobile communication device. The MP_JOIN option in the synchronization acknowledgement packet may include parameters, such as the HMAC X, and a random number B.

The random number B is provided for the mobile communication device to generate a HMAC Y in the next step.

In step S803, the mobile communication device sends an acknowledgement packet including an MP_JOIN option (denoted as ACK with MP_JOIN) to the first base station. The MP_JOIN option in the acknowledgement packet may include parameters, such as the HMAC Y.

In step S804, the first base station replies an acknowledgement packet to the mobile communication device, to complete the process of MPTCP sub-flow creation.

In view of the forgoing embodiments, it will be appreciated that the present application realizes seamless handovers of a mobile communication device by predicting the occurrences of handovers and using the MPTCP to allow smooth transfer of data traffic communication across multiple connection interfaces. Advantageously, service disconnection caused by handovers may be avoided, and user experience may be improved. Moreover, the transceiving performance of the mobile communication device may be enhanced. By contrast, conventional practices of the MPTCP simply split data traffic to be communicated over different sub-flows simultaneously. However, in the situations where the RTT of one connection interface is long and the RTT of another connection interface is short, the packet arrival times on the connection interfaces will vary from each other greatly, and consequently, the sound quality of the VoIP call will be poor.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a wireless transceiver, configured to perform wireless transmission and reception to and from a first base station and a second base station; and
   a controller, configured to:
   communicate data traffic of an application over a first Multi-Path Transmission Control Protocol (MPTCP) sub-flow with the first base station via the wireless transceiver;
   determine a most suitable base station for the mobile communication device according to a machine learning model, wherein the determination of the most suitable base station comprises: using history data of location information and mobility information of the mobile communication device and Quality of Service (QoS) information of the first base station and the second base station, to pre-train the machine learning model; and
   transfer the data traffic to be communicated over a second MPTCP sub-flow with the second base station via the wireless transceiver in response to the most suitable base station being the second base station.

2. The mobile communication device of claim 1, wherein the determination of the most suitable base station according to the machine learning model further comprises:
   using the machine learning model and current data of the location information and the mobility information of the mobile communication device and the QoS information of the first base station and the second base station, to determine a respective prediction level of each of the first base station and the second base station; and
   determining that the most suitable base station is the second base station in response to the prediction level of the second base station being greater than a predetermined threshold.

3. The mobile communication device of claim 1, wherein the controller is further configured to:
   broadcast a User Datagram Protocol (UDP) packet on a predetermined port via the wireless transceiver; and
   receive the machine learning model from the first base station or the second base station via the wireless transceiver after broadcasting the UDP packet on the predetermined port.

4. The mobile communication device of claim 1, wherein the controller is further configured to:
   initiate a File Transfer Protocol (FTP) session or a Hyper-Text Transfer Protocol (HTTP) session to download the machine learning model from a remote server via the wireless transceiver.

5. The mobile communication device of claim 1, further comprising:
   a storage device, configured to store the machine learning model.

6. The mobile communication device of claim 1, wherein the controller is further configured to:
   determine whether there is an MPTCP sub-flow between the mobile communication device and the second base station in response to the most suitable base station being the second base station; and
   connect to the second base station via the wireless transceiver to associate the second MPTCP sub-flow with the second base station in response to there being no MPTCP sub-flow between the mobile communication device and the second base station.

7. The mobile communication device of claim 1, wherein the controller is further configured to:
   initiate an MPTCP connection with the first base station via the wireless transceiver, to associate the first MPTCP sub-flow with the first base station.

8. A method for scheduling data traffic communication, executed by a mobile communication device communicatively connected to one or both of a first base station and a second base station, the method comprising:
   communicating data traffic of an application over a first Multi-Path Transmission Control Protocol (MPTCP) sub-flow with the first base station;
   determining a most suitable base station for the mobile communication device according to a machine learning model, wherein the determination of the most suitable base station comprises: using history data of location information and mobility information of the mobile communication device and Quality of Service (QoS) information of the first base station and the second base station, to pre-train the machine learning model; and transferring the data traffic to be communicated over a second MPTCP sub-flow with the second base station in response to the most suitable base station being the second base station.

9. The method of claim 8, wherein the determination of the most suitable base station according to the machine learning model further comprises:

using the machine learning model and current data of the location information and the mobility information of the mobile communication device and the QoS information of the first base station and the second base station, to determine a respective prediction level of each of the first base station and the second base station; and determining that the most suitable base station is the second base station in response to the prediction level of the second base station being greater than a predetermined threshold.

10. The method of claim 8, further comprising:

broadcasting a User Datagram Protocol (UDP) packet on a predetermined port; and receiving the machine learning model from the first base station or the second base station after broadcasting the UDP packet on the predetermined port.

11. The method of claim 8, further comprising:

initiating a File Transfer Protocol (FTP) session or a HyperText Transfer Protocol (HTTP) session to download the machine learning model from a remote server.

12. The method of claim 8, wherein the mobile communication device comprises a storage device configured to store the machine learning model.

13. The method of claim 8, further comprising:

determining whether there is an MPTCP sub-flow between the mobile communication device and the second base station in response to the most suitable base station being the second base station; and connecting to the second base station to associate the second MPTCP sub-flow with the second base station in response to there being no MPTCP sub-flow between the mobile communication device and the second base station.

14. The method of claim 8, further comprising:

initiating an MPTCP connection with the first base station to associate the first MPTCP sub-flow with the first base station.

15. A mobile communication device, comprising:

a wireless transceiver, configured to perform wireless transmission and reception to and from a first base station and a second base station; and a controller, configured to:

communicate data traffic of an application over a first Multi-Path Transmission Control Protocol (MPTCP) sub-flow with the first base station via the wireless transceiver;

determine a most suitable base station for the mobile communication device according to a rule-based model, wherein the determination of the most suitable base station comprises: using predetermined rules and current data of location information and mobility information of the mobile communication device and QoS information of the first base station and the second base station, to determine whether the first base station or the second base station is the most suitable base station for the mobile communication device; and transfer the data traffic to be communicated over a second MPTCP sub-flow with the second base station via the wireless transceiver in response to the most suitable base station being the second base station.

16. A method for scheduling data traffic communication, executed by a mobile communication device communicatively connected to one or both of a first base station and a second base station, the method comprising:

communicating data traffic of an application over a first Multi-Path Transmission Control Protocol (MPTCP) sub-flow with the first base station;

determining a most suitable base station for the mobile communication device according to a rule-based model, wherein the determination of the most suitable base station comprises: using predetermined rules and current data of location information and mobility information of the mobile communication device and QoS information of the first base station and the second base station, to determine whether the first base station or the second base station is the most suitable base station for the mobile communication device; and transferring the data traffic to be communicated over a second MPTCP sub-flow with the second base station in response to the most suitable base station being the second base station.

* * * * *